(12) United States Patent
Goyer et al.

(10) Patent No.: US 10,190,619 B2
(45) Date of Patent: Jan. 29, 2019

(54) SEALING NUT

(71) Applicant: LISI Aerospace, Paris (FR)

(72) Inventors: Julien Goyer, Saint-Gratien (FR); Antoine Villet, Cergy (FR); Nicolas Naretto, Redondo Beach, CA (US)

(73) Assignee: LISI AEROSPACE, Paris (FR)

( * ) Notice: Subject to any disclaimer, the term of this patent is extended or adjusted under 35 U.S.C. 154(b) by 0 days.

(21) Appl. No.: 15/331,854

(22) Filed: Oct. 22, 2016

(65) Prior Publication Data
US 2017/0114823 A1    Apr. 27, 2017

(30) Foreign Application Priority Data

Oct. 22, 2015  (FR) ...................................... 15 60075

(51) Int. Cl.
*F16B 43/00* (2006.01)
*F16B 37/00* (2006.01)
*F16B 41/00* (2006.01)

(52) U.S. Cl.
CPC ............ *F16B 43/001* (2013.01); *F16B 37/00* (2013.01); *F16B 41/002* (2013.01); *F16B 43/00* (2013.01)

(58) Field of Classification Search
CPC ...... F16B 33/004; F16B 37/00; F16B 41/002; F16B 43/00; F16B 43/001
USPC .................... 411/369, 371.1, 371.2, 432, 542
See application file for complete search history.

(56) References Cited

U.S. PATENT DOCUMENTS

| | | | |
|---|---|---|---|
| 3,316,952 A | 5/1967 | Hollinger | |
| 3,399,589 A * | 9/1968 | Breed | F16B 33/004 264/268 |
| 3,520,342 A * | 7/1970 | Scheffer | F16B 33/004 411/303 |
| 4,367,060 A * | 1/1983 | Berecz | F16B 33/004 411/303 |
| 5,388,941 A * | 2/1995 | Wuenscher | B62D 5/061 411/303 |
| 5,393,182 A * | 2/1995 | Berecz | F16B 33/004 411/369 |
| 5,454,675 A | 10/1995 | Dehaitre | |

(Continued)

FOREIGN PATENT DOCUMENTS

| | | |
|---|---|---|
| EP | 2682615 | 1/2014 |
| WO | WO 2014/087108 | 6/2014 |

OTHER PUBLICATIONS

Poll, Andreas; Search Report; dated Jul. 25, 2016; INPI (Institut National de la Propriete Industrialle; 2 pages; Institut National de la Propriete Industrialle. France.

*Primary Examiner* — Roberta S Delisle
(74) *Attorney, Agent, or Firm* — Henricks Slavin LLP

(57) ABSTRACT

The invention relates to a sealing nut comprising a nut and a deformable sealing ring, wherein the nut comprises an annular body, a base comprising a counterbore, and a bore made in the base, the bore comprises an annular back wall having a length extending between a first inner radius and a second inner radius, the sealing ring comprises an annular body and an end face suitable for resting against the back wall, and the end face has a length extending between an inner radius and an outer radius. The ratio between the length of the back wall of the bore and the length of the end face of the ring is between 20 and 45%.

Figure 5:
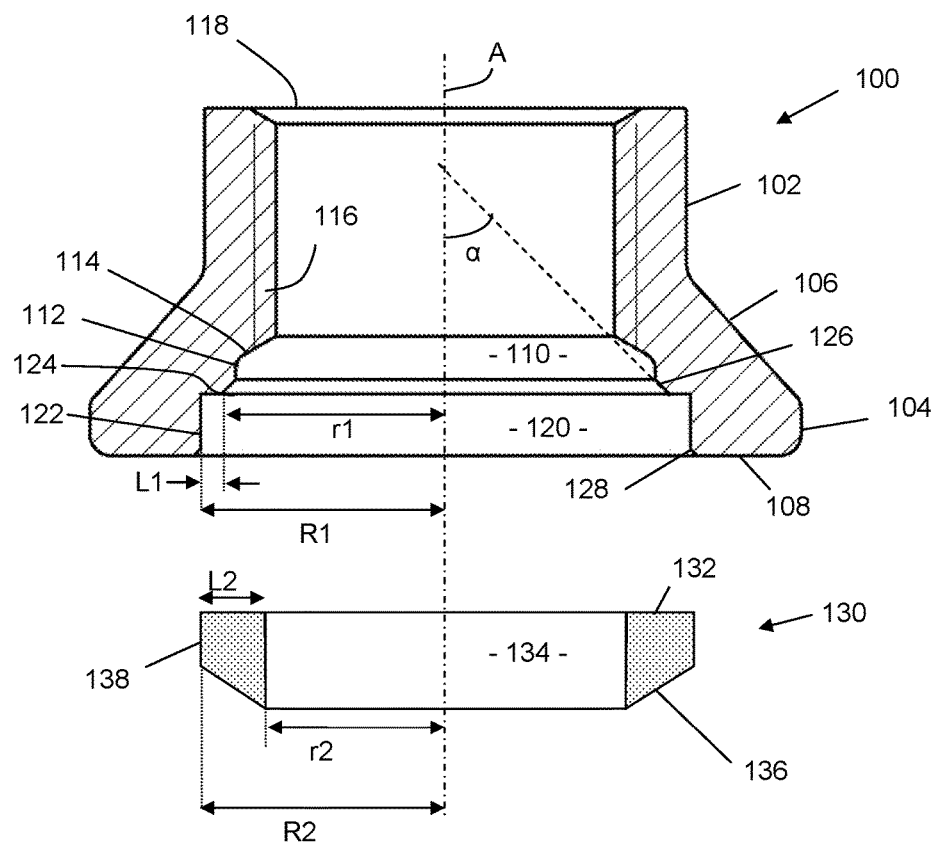

The invention can be used in assemblies of airplane structures.

9 Claims, 3 Drawing Sheets

(56) References Cited

U.S. PATENT DOCUMENTS

| | | | | |
|---|---|---|---|---|
| 6,881,019 B2* | 4/2005 | Wolf | ................... | F16B 39/34 |
| | | | | 411/261 |
| 6,966,736 B2* | 11/2005 | Wolf | ................... | F16B 39/34 |
| | | | | 411/303 |
| 7,597,517 B2 | 10/2009 | Beeles et al. | | |
| 2014/0086702 A1* | 3/2014 | Imai | ................... | F16B 39/28 |
| | | | | 411/190 |

* cited by examiner

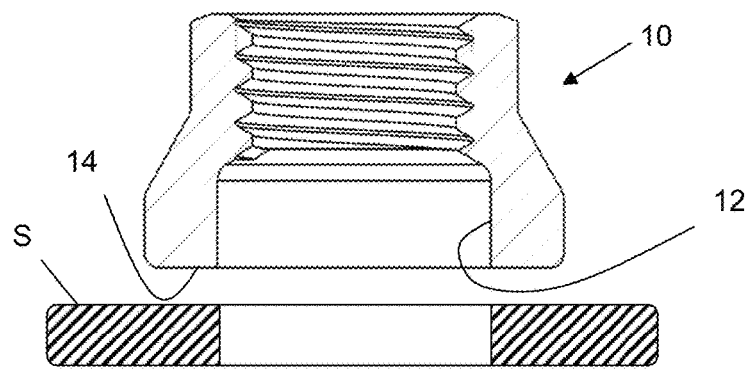
FIG. 1
FIG. 2
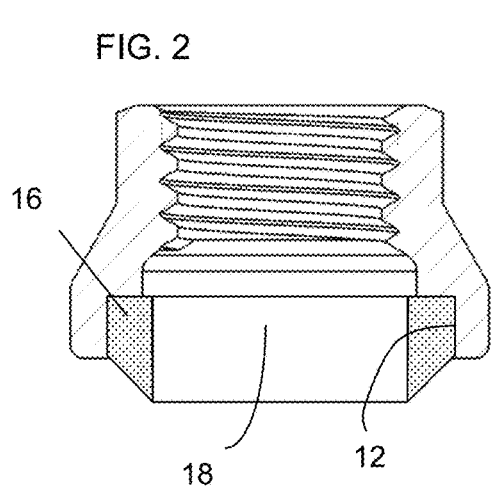
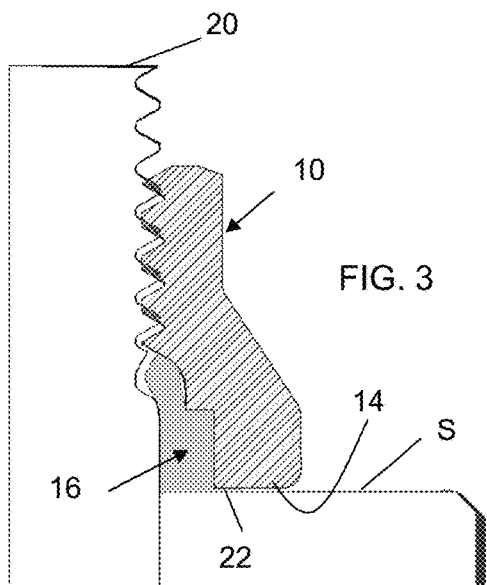
FIG. 3
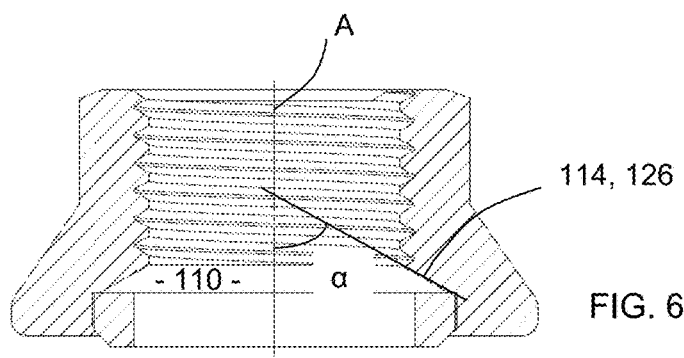
FIG. 6

SEALING NUT

The present invention relates to sealing nuts in general, and in particular to nuts comprising a sealing ring.

Sealing nuts are used in the aeronautical industry to assemble structural elements through which a bolt or equivalent component having an outer thread is inserted, since said elements require an assembly that is impermeable to fluids and vapors.

When structural elements that undergo mainly shearing stresses, traction stresses or a combination of the two have to be assembled, bolts are used that have a smooth cylindrical or conical shank portion having a length that allows said portion to completely pass through a range of thicknesses of the elements to be assembled. The length of the shank allows the assembly of thicknesses that vary between a minimum thickness ("grip min") and a maximum thickness ("grip max"), the difference usually being 1.6 mm (1/16 inch in the imperial system). The range of thicknesses is called "grip capacity" in English.

The cylindrical or conical portion of the shank of the bolt used thus protrudes by the length of said range when the bolt passes through elements having the minimum thickness that the bolt can assemble. On the contrary, the cylindrical or conical portion does not protrude when the bolt passes through elements having the maximum thickness that the bolt can assemble.

Moreover, shear bolts generally comprise a shank having an outer diameter greater than the maximum outer diameter of the thread.

To assemble the structural elements, it is therefore necessary to use, together with a shear bolt or tension bolt, a nut 10 shown in FIG. 1, comprising a space 12 made in the bearing surface 14 intended to come in contact with a surface S of one of the elements to be clamped. This space, made between the bearing surface 14 and the first thread of the nut, is conventionally called a counterbore and can have various shapes and dimensions. In the example given above, the counterbore can receive up to 1.6 mm of the shank of the bolt that can protrude from the structure having a minimum thickness.

In certain cases, these nuts must also be sealing nuts. Such a nut is shown in FIG. 2. A deformable sealing ring 16, generally made of Teflon®, is positioned in a bore 18 made in the counterbore 12. The ring 16 has an inner diameter greater than the diameter of the inner thread and the diameter of the smooth shank in order to not interfere with the bolt. The ring is mounted via interference in the bore 18 in order to ensure that the ring is maintained in the nut during transportation.

The sealing ring has a conical shape that generally protrudes from the bearing surface of the nut. Thus, when the nut is pressed against a structural element, the sealing ring is both axially compressed and radially deformed towards the inside of the counterbore and against the shank and/or the threads of the bolt, thus forming a sealed joint.

The applicant has noticed that in certain assembly configurations comprising a bolt 20 and a sealing nut 10 shown in FIG. 3, the ring 16 does not deform entirely into the counterbore 12 but partly deforms 22 into the space between the bearing surface 14 of the nut and the surface S of the element to be clamped. This can occur when the bolt is installed in a structure having a minimum thickness and the entire shank length that protrudes from the structure is located in the counterbore.

Such deformation must be completely avoided since it seriously compromises the mechanical strength of the bolt/nut assembly. In fact, the presence of a lubricating material between the bearing surface of the nut and the surface of the element to be clamped affects the coefficient of friction between these surfaces. When the coefficient of friction is reduced, the tension in the bolt increases beyond the acceptable threshold for the bolt, which can cause the bolt to break.

The present invention relates to a sealing nut that prevents the sealing ring from deforming into the space between the nut and the structure, regardless of the assembly configuration, without reducing the strength, capacity or structural integrity of the assembly or of the components of the assembly.

More specifically, the sealing nut comprises a nut and a deformable sealing ring, the nut comprises an annular body extending in a direction of an axis of revolution, a base comprising a counterbore, and a bore made in the base, and the bore comprises an annular back wall having a length extending between a first inner radius and a second radius. The sealing ring comprises an annular body and an end face suitable for resting against the back wall, and the end face has a length extending between an inner radius and an outer radius. The sealing nut is such that the ratio between the length of the back wall of the bore and the length of the end face of the ring is between 20 and 45%.

Such a configuration allows the sealing ring to always be guided towards the inside of the counterbore, regardless of the configuration of the assembly, without deforming beyond the counterbore or out of the bore.

Moreover, the nut according to the invention can comprise one or more of the following features:

The sealing nut comprises a bevel between the back wall of the bore and a wall of the counterbore of the nut, the bevel makes an angle of between 45° and 60° with the axis of revolution, the back wall and the end face have complementary shapes, the back wall and the end face each comprise a portion positioned substantially perpendicular to the axis of revolution, a wall of the bore comprises a groove extending radially inside the base, and an outer wall of the ring comprises a protrusion having a shape complementary to the shape of the groove, the ring has an outer radius greater than an inner radius of the bore, the ratio between the outer radius of the ring and the inner radius of the bore is between 1.010 and 1.016, the volume of the ring compared to the available volume of the nut is between 70 and 85%, said available volume being the smallest hollow volume inside the nut between a bearing surface and a first thread of the nut, at an end of the inner thread located next to the base, once a bolt has been placed in the nut and when the bolt takes up a maximum volume.

The invention will be better understood after reading the description that follows, in combination with the drawings that illustrate examples of embodiments of the invention.

Figure 7:
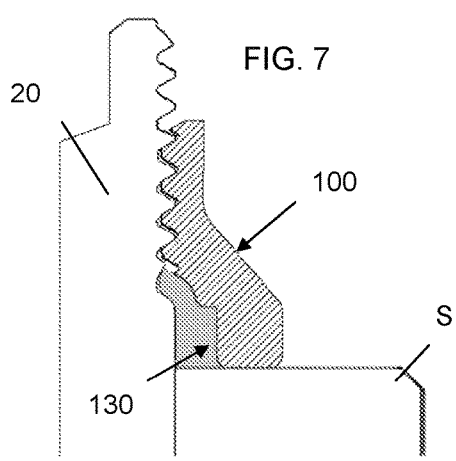
Figure 4:
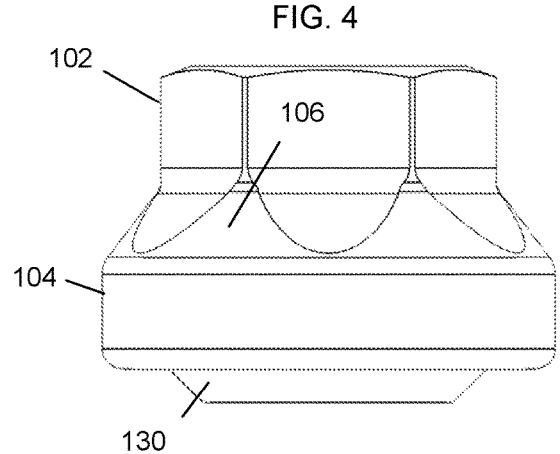
Figure 8:
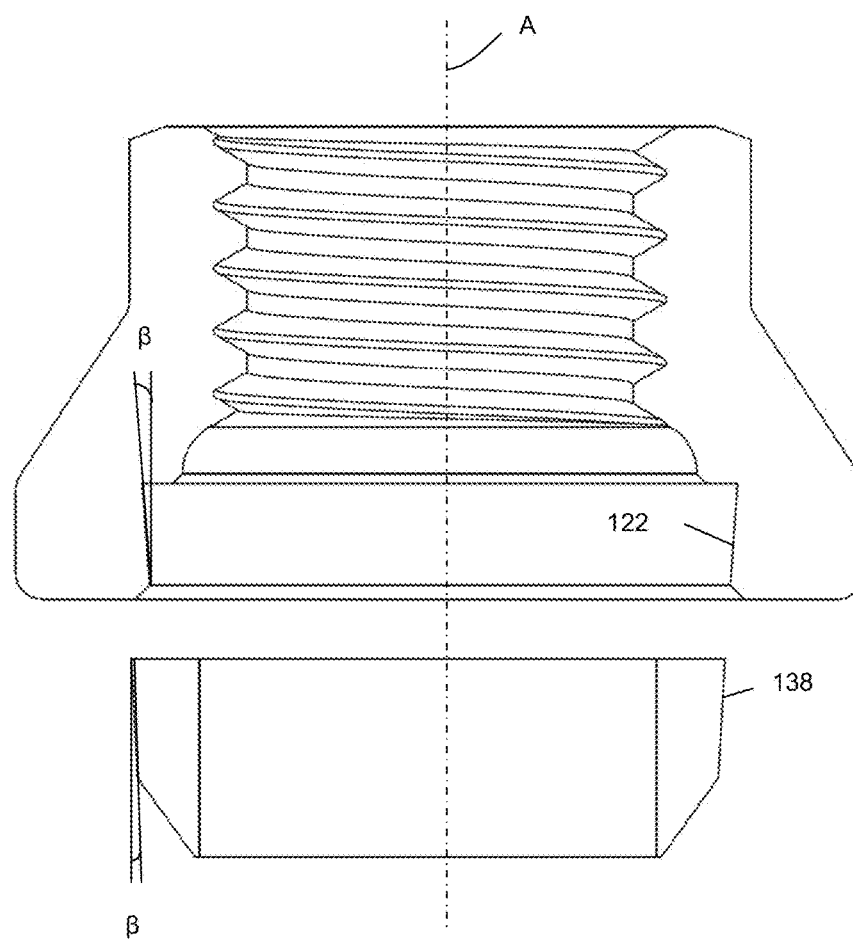

FIG. 1 (already described) is a cross-section of a nut of the prior art having a counterbore, FIG. 2 (already described) is a cross-section of a sealing nut of the prior art, FIG. 3 (already described) is a partial cross-section of an assembly comprising a bolt and a sealing nut of the prior art, FIG. 4 is a side view of a sealing nut according to an embodiment of the invention, FIG. 5 is an exploded cross-sectional view of the sealing nut of FIG. 4, FIG. 6 is a cross-section of a sealing nut according to a second embodiment, FIG. 7 is a partial cross-section of an assembly comprising a bolt and a sealing nut according to an embodiment of the invention, FIG. 8 is a cross-section of a sealing nut according to a third embodiment.

A sealing nut 100, shown in FIGS. 4 and 5, comprises a nut 101 and a sealing ring 130. The nut 101 extends in the direction of an axis of revolution A of said nut and comprises a wrench grip 102 and a base 104. The wrench grip 102 is a hexagon here. The base, having an outer diameter wider than the largest dimension of the hexagon, has an upper surface 106, in the shape of a truncated cone, comprising six faces, recessed with respect to this surface in the shape of a truncated cone, like the faces described in the patent application FR 2937386 from the applicant. Each recessed face is aligned with a flat surface of the hexagonal wrench grip.

More specifically, FIG. 5 shows that the base 104 comprises a bearing surface 108 opposite the surface having the shape of a truncated cone, and a counterbore 110 having a cylindrical wall 112 and an end wall 114 connecting the cylindrical wall 112 and the first thread of the inner thread 116. In this example, the end wall 114 is a surface in the shape of a truncated cone.

The thread 116 extends on the inner surface of the nut, between the end of the end wall 114 and the upper end 118 of the nut, opposite to the bearing surface 108.

The base 104 also comprises a cylindrical bore 120 made in the counterbore 110, opening onto the bearing surface 108 and having a first inner radius R1 greater than the radius of the counterbore 110. The bore 120 comprises a cylindrical wall 122 and a flat back wall 124. In this example, the back wall is substantially perpendicular to the axis A. By substantially, we mean that the angle can vary by a few degrees.

A bevel 126 connects the back wall 124 of the bore 120 to the cylindrical wall 112 of the counterbore 110.

The back wall 124 is an annular surface A1 extending between the first inner radius R1 of the cylindrical wall 122 and a second inner radius r1 defined by the distance between the axis A and the distance at which the bevel 126 intersects the end wall 124.

The annular surface A1 has the value $$A1=(R1^2-r1^2).\pi$$

In two dimensions, the back wall 124 has a length L1 defined by the difference between radii (R1−r1).

The bore 120 is intended to receive a sealing ring 130. A bevel 128 is made around the open contour of the bore in order to guide the insertion of the ring into the bore.

The ring 130 is an annular ring having the axis of revolution A and comprising an upper end face 132 intended to rest against the back wall 124 of the bore 120. Preferably, the upper end face comprises at least one surface having a shape complementary to the shape of the back wall 124 of the nut. In the example illustrated in FIG. 3, the upper end surface 132 is entirely flat and substantially perpendicular to the axis A.

The sealing ring 130 has a hole 134, the diameter of which, equal to twice the inner radius r2 indicated in FIG. 3, is greater than the diameter of the shank of the bolt in order to not interfere with the threads and the shank of the bolt onto which the nut will be screwed. The ring may enter into contact with the shank of the bolt if a bolt having a larger diameter, called oversize bolt, is used during a maintenance operation instead of a bolt having a nominal diameter, but the function of the ring is not to lock the bolt and/or limit the captiveness of the nut.

A lower end face 136 of the sealing ring, opposite to the upper end face 132, has the shape of a truncated cone, and the wall of the hole 134 is longer in the axial direction A than the outer wall 138 intended to enter into contact with the cylindrical wall 122 of the bore.

The outer radius R2 of the ring 130 is greater than the first inner radius R1 of the bore, and thus the ring must be inserted into the bore by force. The interference created allows the ring to be maintained in the bore, in particular during transportation of the ring, storage thereof and the installation of the nut. Preferably, the interference ratio between the outer radius R2 of the ring and the radius R1 of the bore is between 1.010 and 1.016. The greater the nominal diameter—the diameter measured at the root of the threads—of the nut, the smaller the interference ratio.

The bearing surface 132 of the ring is also an annular surface A2 extending between the outer radius R2 and the inner radius r2 and having the value $$A2=(R2^2-r2^2).\pi$$

In two dimensions, the bearing surface 132 of the ring has a length L2 defined by the difference between radii (R2−r2).

In order to prevent any unwanted deformation of the ring, the ratio between the bearing lengths L1 and L2 must be greater than or equal to 20% and less than or equal to 45%, i.e.:

$$20\% \leq L1/L2 \leq 45\%$$

This ratio defines the contact length ratio between the upper end face 132 of the ring 130 and the back wall 124 of the nut 101 in a plane substantially perpendicular to the axis A.

If the contact length ratio between the ring and the nut is less than 20%, there is a risk that during installation, the ring may deform into the counterbore 110 and into the threads of the inner thread 116: the deformation of the ring during insertion into the nut is not controlled. If material from the ring is in the threads, the coefficient of friction between the threads of the bolt and the threads of the nut will be reduced, and the tension in the bolt could rise well above the acceptable limit, which could cause the bolt to break.

If the contact length ratio between the ring and the nut is greater than 45%, there is a risk that the ring 130 may deform into the space between the bearing surface 108 of the nut and the surface of the structure when the nut 130 is installed on a bolt. The risk is also that of causing uncontrolled tension in the bolt because of the reduction of the coefficient of friction between the contact surfaces.

Table 1 below gives examples, by diameter, of the ratio between the bearing lengths L1 and L2 for a range of nuts with various diameters tested by the applicant:

TABLE 1

| nominal nut | L1 (mm) | L2 (mm) | Ratio |
| --- | --- | --- | --- |
| 5 | 0.22 | 1.06 | 21% |
| 6 | 0.24 | 1.09 | 22% |
| 7 | 0.31 | 1.10 | 28% |
| 8 | 0.35 | 0.96 | 36% |
| 10 | 0.37 | 1.11 | 33% |
| 12 | 0.6 | 1.48 | 41% |
| 14 | 0.63 | 1.66 | 38% |
| 16 | 0.41 | 1.96 | 21% |

As previously described, a bevel 126 connects the back wall 124 of the bore 120 to the cylindrical wall 112 of the counterbore 110. Here, the bevel 126 allows the material to be guided towards the counterbore 110. It increases the space available in the counterbore without removing too much material from the base, in order to guarantee the integrity of the base when the base undergoes compression.

The bevel 126 can have various angles a, measured with respect to the axis of revolution A, depending on the nominal diameter of the nut. Table 2 indicates the preferred angle of the bevel 126 for each nut diameter.

TABLE 2

| nominal nut Ø | angle α (°) |
|---|---|
| 5 | 60 |
| 6 | 45 |
| 7 | 45 |
| 8 | 45 |
| 10 | 45 |
| 12 | 45 |
| 14 | 45 |
| 16 | 60 |

In certain configurations, the counterbore 110 can be totally cone-shaped: as shown in FIG. 6, the end wall 114 of the counterbore and the bevel 126 are combined into a single wall having a single angle. In the example of FIG. 6, the angle a with respect to the axis of revolution A is 60°.

The applicant carried out multiple test assemblies and simulated, using finite elements in two dimensions, these same assemblies, each comprising a bolt having the maximum allowable shank diameter, a structure having a minimum thickness, a nut having the minimum allowable volume of the counterbore, and a ring, all the dimensions of which are at the maximum tolerance.

In the first assembly of the prior art, shown in FIG. 3, the nut is a nut of the prior art, with a contact length ratio between 78 and 96%. In a second assembly, shown in FIG. 7, the nut comprises a contact length ratio between 20 and 45%. The bolts 20 are identical in the two assemblies having the same structural thicknesses.

As previously indicated, in the assembly in FIG. 3, the material of the ring 16 does not deform entirely into the counterbore 12, but partly deforms 22 into the space between the bearing surface 14 of the nut and the surface S of the element to be clamped.

In the assembly of FIG. 7 comprising the nut of FIG. 5, no material of the ring has deformed into the space between the nut and the structure, and there is no space between the wall of the counterbore and the shank of the screw. The impermeability is therefore better, and the risk of exceeding the UTS of the bolt is eliminated.

Preferably, a volume of the ring 130 formed by the volume of the material of the ring 130, when compared to the available volume of the nut 101, is in a range between 70 and 85%. The available volume in question here is the smallest hollow volume inside the nut 101 between the bearing surface 108 and the first thread of the inner thread 116 once the bolt has been placed in the nut, when the bolt takes up a maximum volume. By convention, the maximum volume of the bolt in the available space is calculated as a height of the counterbore 110 between the bearing surface 108 and the first thread of the inner thread 116 on the end next to said counterbore, multiplied by a surface area of a cross-section of the smooth shank of the bolt perpendicular to the axis of revolution A. Below 70%, the volume of the ring is too small with respect to the volume of the counterbore, and the nut can no longer be impermeable. Above 85%, there is a risk that the ring may deform out of the counterbore towards the threads or under the base and compromise the integrity of the nut during installation.

The nut is preferably made of a titanium alloy, and the ring is, for example, made of PTFE (also sold under the brand name Teflon™ by the company Dupont de Nemours), in order to keep the nut light. Of course, the nut and the ring can be made from another material if the weight is not a major criterion.

The wrench grip comprises, in a known manner, a locking means, such as an elliptical deformation or a three-point deformation of the inner thread, made on an outer surface of the nut near the upper end 118. If the nut is made from a titanium alloy, the locking will preferably be carried out according to the method described in the patent FR2947597 from the applicant.

The invention is not limited to the only example described above. Thus, the nut can comprise a base in the shape of a truncated cone, without a hollow with respect to the upper surface in the shape of a truncated cone.

The wall of the bore 120 can be conical, with an angle β between 2° and 5° between the wall 122 and the axis A of the nut 101 and opening from the bearing surface 108 towards the back wall 124, in order to improve the retention of the ring 130 in the bore, in particular at low temperature (FIG. 8). The ring 130 itself has the same angle β between 2° and 5° between the outer wall 138 and the axis A. Beyond an angle of 5°, the ring can no longer be inserted into the conical bore 120. Below 2°, the difference in angle is not sufficient to improve the retention of the ring with respect to a cylindrical wall. The interference ratio between an outer radius R2 of the ring and a radius R1 of the bore, said radii being positioned at the same axial distance from the back wall 124 and the upper end surface 132, respectively, is also between 1.010 and 1.016.

A surface other than the bevel 126 can be used in order to connect the end wall 124 of the bore and the cylindrical wall 112 of the counterbore, for example a rounded or multi-rounded surface.

Likewise, the back wall of the counterbore can be conical or can comprise, from the cylindrical wall of the bore, a conical portion and then a portion perpendicular to the axis of revolution A. In these cases, the end face of the ring that is in contact with the back wall will, respectively, be conical or comprise a conical portion complementary to the portion of the back wall and a portion perpendicular to the axis of revolution. The measurements of the lengths L1 and L2 can be either carried out in the angular direction or projected onto a direction substantially perpendicular to the axis of revolution. Since the two surfaces have the same angle with respect to the axis of revolution, the ratio of the two projected lengths will be equal to the ratio of the lengths measured in the angular direction.

In another variant, the bore can comprise a groove extending radially inside the wall 122 of the bore—whether the wall is cylindrical or conical—and having a radius greater than the radius R1 of the bore. The ring can comprise a protrusion extending radially outside of the wall 138 and having a shape and dimensions complementary to the shape and dimensions of the groove, that is to say, that allow said protrusion to be inserted into said groove. The groove/protrusion assembly allows the retention of the ring in the nut to be improved. In this case, the additional dimensions of the grooves and protrusions are not taken into account for the measurements of the lengths L1 and L2. The grooves and protrusions can be circular or extend only partly around the bore and the ring.

The invention claimed is:

1. A sealing nut comprising a nut and a deformable sealing ring, wherein the nut comprises an annular body extending in a direction of an axis of revolution (A), a base comprising a counterbore, and a second counterbore made in said base, the second counterbore comprises an annular back wall having a length extending between a first inner radius (R1) and a second inner radius (r1), the sealing ring comprises an annular body and an upper end face (A2) suitable for resting against the back wall of the second counterbore, and said upper end face has a length extending between an inner radius (r2) and an outer radius (R2), characterized in that the ratio between the length (L1) of the back wall of the second counterbore and the length (L2) of the upper end face (A2) of the ring is between 20 and 45%.

2. A sealing nut according to claim 1, wherein the nut comprises a bevel between the back wall of the second counterbore and a wall of the counterbore of said nut.

3. A sealing nut according to claim 2, wherein the bevel makes an angle (α) between 45° and 60° with respect to the axis of revolution (A).

4. A sealing nut according to claim 1, such that the back wall of the second counterbore and the upper end face (A2) of the ring have complementary shapes.

5. A sealing nut according to claim 4, such that the back wall and the upper end face (A2) each comprise a portion positioned substantially perpendicular to the axis of revolution (A).

6. A sealing nut according to claim 1, such that the ring has an outer radius (R2) greater than a first inner radius (R1) of the second counterbore.

7. A sealing nut according to claim 6, such that a ratio between the outer radius (R2) of the ring and the first inner radius (R1) of the second counterbore is between 1.010 and 1.016.

8. A sealing nut according to claim 1, such that a wall of the second counterbore comprises a groove extending radially inside the base, and an outer wall of the ring comprises a protrusion having a shape complementary to the shape of said groove.

9. A sealing nut according to claim 1, such that a volume of the ring is between 70 and 85% of an available volume of the nut, said available volume being the smallest hollow volume inside the nut between a bearing surface and a first thread of said nut, at an end of an inner thread located next to the base, once a bolt has been placed in the nut and when the bolt takes up a maximum volume.

* * * * *